United States Patent [19]
Saito

[11] 4,269,099
[45] May 26, 1981

[54] BANDSAW BLADE TENSIONING APPARATUS FOR HORIZONTAL BANDSAW MACHINES

[76] Inventor: Shuichi Saito, 990-12, Horinishi, Hadano-shi, Kanagawa-ken, Japan

[21] Appl. No.: 53,328

[22] Filed: Jun. 29, 1979

[30] Foreign Application Priority Data

Jun. 30, 1978 [JP] Japan ................ 53-89331[U]

[51] Int. Cl.³ ................ B23D 55/10; B27B 13/08
[52] U.S. Cl. ................................................ 83/819
[58] Field of Search ........................................ 83/816

[56] References Cited
U.S. PATENT DOCUMENTS 3,889,567  6/1975  Sato et al. ................ 83/818

FOREIGN PATENT DOCUMENTS 596436  2/1978  U.S.S.R. ................ 83/819
605710  4/1978  U.S.S.R. ................ 83/819

Primary Examiner—Donald R. Schran
Attorney, Agent, or Firm—Thompson, Birch, Gauthier & Samuels

[57] ABSTRACT

A hydraulic tensioning apparatus for the blade of a bandsaw machine. The blade is trained around a pair of wheels, one of which is mounted on a carrier which is movable relative to the other wheel. The carrier is acted upon by a double acting hydraulic motor, the operation of which is controlled by a manually adjustable valve. A check valve blocks the escape of hydraulic fluid from the motor when the manually adjustable valve is set to the "tension" mode.

2 Claims, 4 Drawing Figures

BANDSAW BLADE TENSIONING APPARATUS FOR HORIZONTAL BANDSAW MACHINES

BACKGROUND OF THE INVENTION

1. Field of the Invention

The present invention relates generally to so-called horizontal bandsaw machines in which an endless bandsaw blade is trained between wheels so as to perform cutting operations and, more particularly, to an apparatus for tensioning a bandsaw blade in horizontal bandsaw machines.

2. Description of the Prior Art

Horizontal bandsaw machines comprise a base having a work-table on which workpieces or materials to be cut are placed and a saw head assembly which encloses or holds a flexible endless bandsaw blade and is so arranged as to be raised away from and lowered towards the work-table. In the saw head assembly, the flexible endless bandsaw blade is trained around bandsaw wheels or pulleys which are mounted for rotation on spaced substantially parallel axes so as to perform cutting operations. One of the bandsaw wheels is power driven and acts as a driving wheel to drive the bandsaw blade, and the other bandsaw wheel which is referred to as driven wheel is drawn or biased together with its shaft in a radial direction away from the driving wheel to tension the bandsaw blade. Also, the bandsaw blade trained around the driving and driven wheels is slidably guided by a plurality of guide means so that its cutting edge, when passing through the cutting zone where cutting is performed, may be kept perpendicular to the work-table. Thus, in cutting operations, the saw head assembly with the bandsaw blade driven therein is lowered from its raised position towards the work-table so that the bandsaw blade may cut into the workpieces placed on the work-table.

In the horizontal bandsaw machines of the above described arrangement, it is necessary to keep the bandsaw blade always adequately tensioned between the driving and driven wheels so as to prevent the bandsaw blade from being uselessly worn and broken and perform accurate cutting operations. The lack of the tension of the bandsaw blade will reduce the friction between the bandsaw blade and the driving and driven wheels with a result that the driving wheel will slide on the bandsaw blade without driving the same or otherwise the bandsaw blade will slip off from the driving and driven wheels. Also, if the driving wheel slides on the bandsaw blade, they are worn by each other because of friction, and besides the bandsaw blade will be broken, since it will be forcedly fed into a workpiece to be cut by the saw head assembly while not driven by the driving wheel. Furthermore, as is readily understood by those skilled in the art, the bandsaw blade, while not adequately tensioned, will be unable to perform accurate cutting, even if it is driven by the driven wheel. Since the bandsaw blade will gradually elongate between the driving and driven wheels as it continues performing operations, it is necessary to additionally tension the bandsaw blade to keep the same always adequately tensioned.

On the other hand, when the bandsaw blade is to be firstly installed, initially the driven wheel is slightly moved towards the driving wheel and then the bandsaw blade is installed around the driving and driven wheels and lastly the driven wheel is drawn away from the driving wheel to tension the bandsaw blade. In this procedure, the bandsaw blade is held by hand around the driving and driven wheels when tensioned so that it will not drop off from the driving and driven wheels.

In the past, various attempts have been made to tension the bandsaw blade and keep the same always adequately tensioned in horizontal bandsaw machines, but all of the prior art apparatus for such purposes have suffered from serious shortcomings. In conventional apparatus, for example, a lead screw has been so arranged as to be manually operated to tension the bandsaw blade, and a spring means has been employed so as to compensate for lack of the tension of the bandsaw blade, but of course the bandsaw blade cannot be adequately and accurately tensioned in such manually operated apparatus. Also, although there have been more improved apparatus in which the bandsaw blade is hydraulically tensioned, such apparatus have been divergent and complicated in construction and have not been easy to operate. Among others, the most serious disadvantage with conventional apparatus for tensioning the bandsaw blade in horizontal bandsaw blade has been the fact that more than one operator is required to first install the bandsaw blade and tension the same between the driving and driven wheels. More particularly, when the bandsaw blade is to be first installed, not only an operator has been necessary to tension the bandsaw blade, but also at least one other operator has had to hold the bandsaw blade around the driving and driven wheels to prevent the same from dropping off therefrom.

SUMMARY OF THE INVENTION

It is an object of the present invention to provide an apparatus for tensioning the bandsaw blade and keeping the same always adequately tensioned in horizontal bandsaw machines.

It is another object of the present invention to provide an apparatus for tensioning the bandsaw blade in horizontal bandsaw machines which is compact and simple in construction and can be easily operated.

It is a further and important object of the present invention to provide an apparatus for tensioning the bandsaw blade in horizontal bandsaw machines which enables only a single operator to initially install the bandsaw blade and tension the same between the driving and driven wheels.

Other and further objects and advantages of the present invention will be apparent from the following description and accompanying drawings which, by way of illustration, show a preferred embodiment of the present invention and the principle thereof.

DESCRIPTION OF THE PREFERRED EMBODIMENTS

Figure 1:
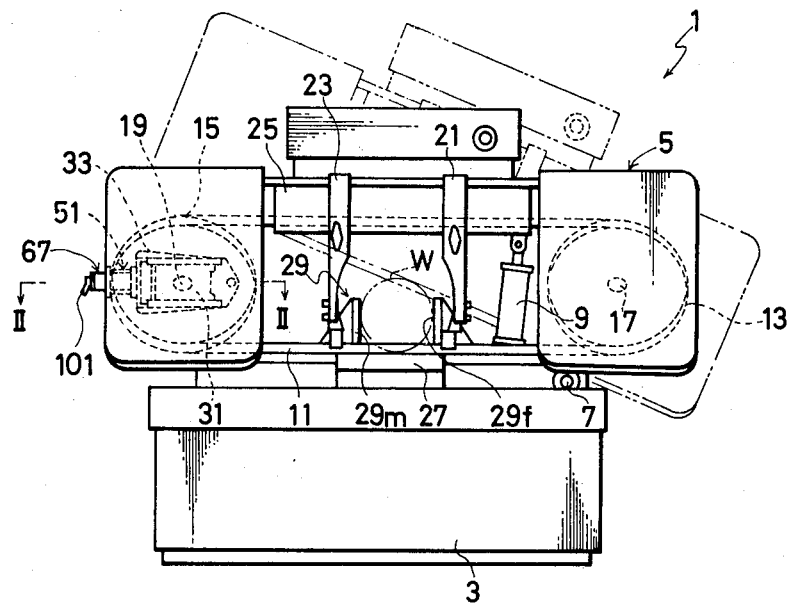
FIG. 1 is a front elevational view of a horizontal bandsaw machine in which an apparatus embodying the principles of the present invention has been incorporated.

Referring to FIG. 1, a horizontal bandsaw machine generally designated by the numeral 1 comprises a base 3 and a saw head assembly 5 which is pivotally connected to the base 3 by a hinge pin 7 and is so arranged as to be raised and lowered from and towards the base 3 by a hydraulic motor 9 of a cylinder type. In the saw head assembly 5, a flexible endless bandsaw blade 11 is trained around driving and driven wheels 13 and 15 having driving and driven shafts 17 and 19, respectively, so that it may be driven to make a cutting action when the driving wheel 13 is power driven. The bandsaw blade 11 is slidably held or guided with its cutting edges faced vertically downwardly by a pair of guide arms 21 and 23 which are adjustably held by a beam member 25 fixed at the upper portion of the saw head assembly 5. Generally, the driving and driven shafts 17 and 19 of the driving and driven wheels 13 and 15 are both tilted, and the driving shaft 17 is disposed at a fixed position, while the driven shaft 19 is so arranged as to be slightly moved towards and away from the driving shaft 17 to release and tension the bandsaw blade 11. Also, a work-table 27 is mounted on the base 3 so that a workpiece W to be cut may be placed thereon, and a vise assembly 29 having a fixed jaw 29f and a movable jaw 29m is also mounted on the base 3 to hold the workpiece W to be cut therebetween. Thus, when the saw head assembly 5 is swung down around the hinge pin 7 from its raised position shown by the broken lines in FIG. 1, the bandsaw blade 11 rotating around the driving and driven wheels 13 and 15 in the saw head assembly 5 will be fed to cut the workpiece W held by the vise assembly 29 on the work-table 27.

Figure 2:
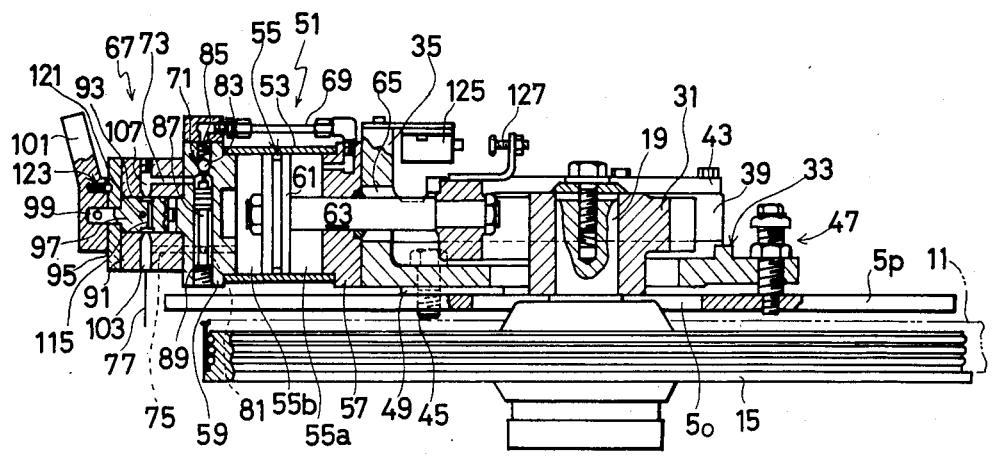
FIG. 2 is a partial view showing a portion of the horizontal bandsaw machine shown in FIG. 1 in section substantially taken along the line II—II of FIG. 1.
Figure 3:
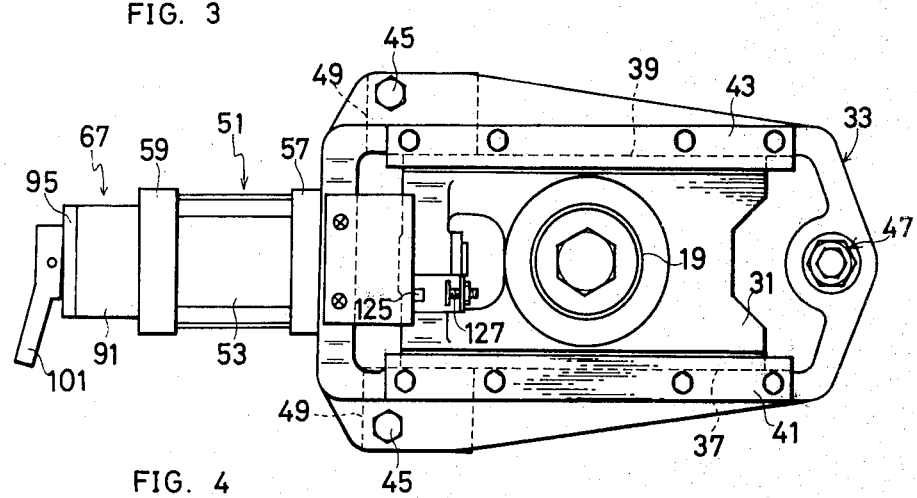
FIG. 3 is a partial view showing the back portion of the portion shown in FIG. 2 of the horizontal bandsaw machine shown in FIG. 1.

Referring to FIGS. 2 and 3, the driven shaft 19 of the driven wheel 15 is so disposed as to project generally rearwardly of the saw head assembly 5 through an opening 5o which is formed through a base plate 5p of the saw head assembly 5, and it is fixed at or journaled in a carriage member 31 of a substantially rectangular shape. The carriage member 31 is so arranged as to be moved to move the driven shaft 19 and the driven wheel 15 radially towards and away from the driving shaft 17 and the driving wheel 13 so as to release and tension the bandsaw blade 11 therebetween. For this purpose, the carriage member 31 is slidably mounted on a holding member 33 which is of a plate-like member having a projection 35 and is provided with a pair of guide ways 37 and 39 when the carriage member 31 is slidably held by plate members 41 and 43. The holding member 33 holding the carriage member 31 is fixed to the back portion of the base plate 5p of the saw head assembly 5 by a plurality of bolts 45 and an adjusting bolt 47 in the preferred embodiment. Also, a plurality of elastic members 49 are provided between the base plate 5p of the saw head assembly 5 and the holding member 33 in the preferred embodiment so as to absorb the vibration of the saw head assembly 5.

In order to move the carriage member 31, there is provided a hydraulic motor 51 which is constructed of a cylinder 53 having a chamber 55 enclosed by cap members 57 and 59 and has a piston 61 having a piston rod 63 and dividing the chamber 55 into two chambers 55a and 55b. The hydraulic motor 51 is fixed at the back of the swing end of the saw head assembly 5 with its cap member 57 adjacent to the projection 35 of the holding member 33, and the piston rod 63 of the hydraulic motor 51 is so disposed as to extend through an opening 65 formed through the projection 35 and is connected to the carriage member 31. Thus, when either of the chambers 55a and 55b of the hydraulic motor 51 is supplied with the hydraulic fluid, the piston 61 and the piston rod 63 will move the carriage member 31 along the guide ways 37 and 39 of the holding member 33 to move the driven shaft 19 and the driven wheel 15 radially toward and away from the driving shaft 17 and the driving wheel 13 to release and tension the bandsaw blade 11. As is readily apparent, the bandsaw blade 11 will be tensioned when the chamber 55a of the hydraulic motor 51 is supplied with the hydraulic fluid, and it will be released when the chamber 55b of the same is supplied with the hydraulic fluid.

Figure 4:
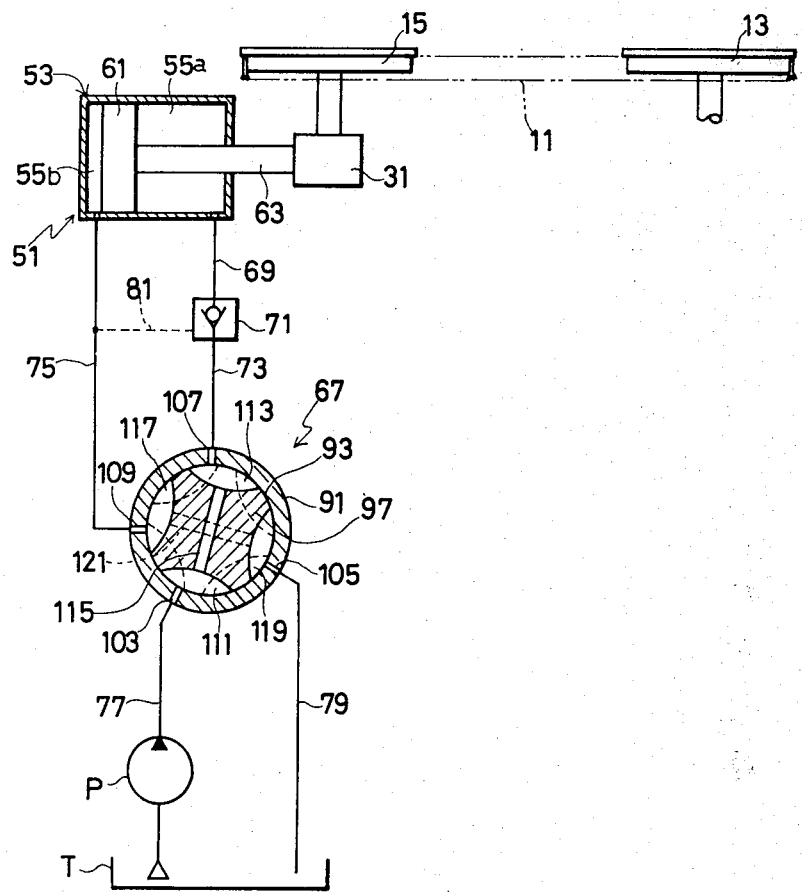
FIG. 4 is a schematic illustration of a portion of the horizontal bandsaw machine shown in FIG. 1.

As best shown in FIGS. 2 and 4, the chamber 55a of the hydraulic motor 51 is connected to a rotary valve assembly 67 through a passage 69, a pilot operated check valve means 71 and a passage 73, and the chamber 55b of the same is also connected to the rotary valve assembly 67 by means of a passage 75. The rotary valve assembly 67 is connected by a passage 77 with a hydraulic pump P connected with a hydraulic tank T, and it is also connected by a drain passage 79 directly to the hydraulic tank T. As will be described in greater detail hereinafter, the rotary valve assembly 67 is so designed as to connect either of the chambers 55a and 55b of the hydraulic motor 51 with the hydraulic pump P with the other of the chambers 55a and 55b of the same connected to the hydraulic tank T through the drain passage 79.

Also, the pilot operated check valve means 71 is connected by a passage 81 to the passage 75 connecting the chamber 55b of the hydraulic motor 51 and the rotary valve assembly 67.

The pilot operated check valve means 71 is so arranged as to allow the hydraulic fluid to flow into the chamber 55a of the hydraulic motor 51 and allow the hydraulic fluid to drain from the chamber 55a only when the hydraulic pressure prevailing in the passage 75 is increased. In the preferred embodiment, the pilot operated check valve means 71 comprises a ball member 83, a spring 85 and a poppet member 87 which is slidably put in a bore 89 formed at the cap member 59 of the hydraulic motor 51 so as to push the ball member 83 when the hydraulic pressure is increased in the passage 75. Thus, the pilot operated valve means 71 will normally block the hydraulic fluid from being drained from the chamber 55a of the hydraulic motor 51, but it will allow the same to drain therefrom when the chamber 55b of the hydraulic motor 51 is being supplied with the hydraulic fluid through the passage 75 from the hydraulic pump P.

The rotary valve assembly 67 is integrally connected to the hydraulic motor 51 at the swing end of the saw head assembly 5 and it is constructed of a casing 91 which is fixed to the cap member 59 of the hydraulic motor 51. The casing 91 of the rotary valve assembly 67 has a cylindrical bore 93 closed by a cap member 95 and encloses therein a cylindrical rotary valve member 97 which has a shank portion 99 projecting out through the cap member 95 and fixed with a lever member 101. Also, the casing 91 is formed with four ports 103, 105, 107 and 109 which are connected with the passages 77, 79, 73 and 75, respectively, and are all open to the bore 93. The rotary valve member 97 is formed at its periphery with a pair of grooves 111 and 113 connected with each other by a passage 115 and another pair of grooves 117 and 119 connected with each other by a passage 121. These grooves 111, 113, 117 and 119 and passages 115 and 121 are so formed as to connect either of the ports 107 and 109 with the port 103 with the other of them connected to the port 105 when the rotary valve member 97 is selectively rotated by the lever member 101. More particularly, the rotary valve member 97 is so designed as to connect the ports 103 and 107 by the grooves 111 and 113 and the passage 115 and also connect the ports 105 and 109 by the grooves 119 and 117 and the passage 121 at the same time, or otherwise connect the ports 103 and 109 by the groove 111 and also connect the ports 105 and 107 by the grooves 119 and 117 and the passage 121. Thus, either of the chambers 55a and 55b of the hydraulic motor 51 can be supplied with the hydraulic fluid from the hydraulic pump P with the other of the chambers 55a and 55b connected to the hydraulic tank T through the drain passage 79. In FIG. 4, the rotary valve member 97 has been shown as connecting the port 107 with the port 103, and the port 109 to the port 105 so as to supply the hydraulic fluid into the chamber 55a of the hydraulic motor 51 and simultaneously drain the hydraulic fluid from the chamber 55b of the same to the hydraulic tank T. However, when the rotary valve member 97 is rotated by the lever member 101 to be set as shown by the imaginary lines in FIG. 4, the port 103 is connected with the port 109 by the groove 111 and also the ports 105 and 107 are connected with each other by the grooves 119 and 117 and the passage 121 so as to supply the hydraulic fluid into the chamber 55b of the hydraulic motor and simultaneously drain the same from the chamber 55a.

From the above description, it will be now understood that the piston 61 and the piston rod 63 of the hydraulic motor 51 can be selectively moved in either direction by rotating the rotary valve member 97 by the lever member 101 so as to tension and release the bandsaw blade 11. When the ports 107 and 109 are connected with the ports 103 and 105, respectively, the hydraulic fluid is supplied by the hydraulic pump P into the chamber 55a of the hydraulic motor 51 and the hydraulic fluid in the chamber 55b will be drained to the hydraulic tank T, and accordingly the piston 61 and the piston rod 63 will be moved to tension the bandsaw blade 11. Also, when the ports 107 and 109 are connected with the ports 105 and 103, respectively, the hydraulic fluid is supplied into the chamber 55b of the hydraulic motor 51 and the hydraulic fluid in the chamber 55a of the same will be drained so as to enable the piston 61 and the piston rod 63 to release the bandsaw blade 11.

In order to easily selectively position the rotary valve member 97 in the rotary valve assembly 67, the lever member 101 is provided with a click means 123. Also, a switch means 125 such as a limit switch is provided on the holding member 33 and a dog member 127 for actuating the switch means 125 is fixed on the carriage member 31 so that they will stop the bandsaw machine 1 when the bandsaw blade 11 is broken. Furthermore, a relief valve means and a pressure control valve means are provided in the hydraulic circuit, although they are not shown in the drawings.

As has been far described in the above, the bandsaw blade 11 can be easily tensioned and released only by operating the lever member 101 of the rotary valve assembly 67 according to the present invention. Also, the bandsaw blade 11 can be kept always adequately tensioned by so setting the rotary valve assembly 67 as to supply the chamber 55a of the hydraulic motor 51 with the hydraulic fluid from the hydraulic pump P. In this connection, the apparatus according to the present invention can be so set as to keep the tension of the bandsaw blade 11 optimum according to the variety of the bandsaw blade 11 by means of the pressure control valve means. Furthermore, as a matter of importance, the bandsaw blade 11 can be easily installed only by a single operator, since the rotary valve assembly 67 for tensioning the bandsaw blade 11 is provided in the neighbourhood of the driving and driven wheels 13 and 15 and the lever member 101 of the rotary valve assembly 67 can be operated with the bandsaw blade 11 held by hand around the driving and driven wheels 13 and 15 to initially tension the same.

Although a preferred form of the present invention has been illustrated and described, it should be understood that the device is capable of modification by one skilled in the art without departing from the principles of the invention. Accordingly, the scope of the invention is to be limited only by the claims appended hereto.

I claim:

1. A tensioning apparatus for a bandsaw blade which is trained around a pair of wheels, with one wheel being supported on a carriage member which is movable relative to the other wheel, said apparatus comprising:
   a hydraulic motor having a cylinder internally subdivided by a reciprocal piston into first and second chambers;
   a piston rod extending through said first chamber and said cylinder for connecting said piston to said carriage member;
   a reservoir of hydraulic fluid;
   a pump for pumping hydraulic fluid under pressure from said reservoir;
   valve means;
   first and second conduit means respectively connecting said first and second chambers to said valve means;
   third and fourth conduit means respectively connecting said valve means to the outlet of said pump and said reservoir;
   said valve means being manually adjustable to alternately connect either of said chambers with the outlet of said pump while simultaneously connecting the other of said chambers to said reservoir;
   normally closed check valve means in said first conduit means for blocking the flow of fluid therethrough from said first chamber, said check valve means being adjustable to an open position in response to fluid pressure from the outlet of said pump; and,
   additional conduit means for connecting said second conduit means to said check valve means, thereby opening said check valve means to permit flow of fluid from said first chamber through said valve means to said reservoir as pressurized fluid is fed from said pump outlet through said valve means to said second chamber.

2. The tensioning apparatus as claimed in claim 1 wherein said check valve means is contained within one end of said cylinder.

* * * * *